United States Patent [19]

Inoue

[11] 4,236,057
[45] Nov. 25, 1980

[54] APPARATUS FOR DETECTING GAP CONDITIONS IN EDM PROCESSES WITH MONITORING PULSES

[75] Inventor: Kiyoshi Inoue, Tokyo, Japan

[73] Assignee: Inoue-Japax Research Incorporated, Yokohamashi, Japan

[21] Appl. No.: 860,164

[22] Filed: Dec. 13, 1977

[30] Foreign Application Priority Data

Dec. 14, 1976 [JP] Japan .............................. 51-150052
Jan. 12, 1977 [JP] Japan .............................. 52-2806
Feb. 8, 1977 [JP] Japan .............................. 52-13451
Feb. 16, 1977 [JP] Japan .............................. 52-15889
Feb. 22, 1977 [JP] Japan .............................. 52-18484
Mar. 8, 1977 [JP] Japan .............................. 52-25066

[51] Int. Cl.³ .............................................. B23P 1/02
[52] U.S. Cl. ................................... 219/69 C; 219/69 P
[58] Field of Search ................ 219/69 C, 69 P, 69 M, 219/69 G

[56] References Cited

U.S. PATENT DOCUMENTS

| 2,979,639 | 4/1961 | Williams et al. ................... 219/69 P |
| 3,988,560 | 10/1976 | Losey et al. ........................ 219/69 C |
| 3,997,753 | 12/1976 | Inoue ................................... 219/69 C |
| 4,021,635 | 5/1977 | Losey et al. ........................ 219/69 C |

Primary Examiner—B. A. Reynolds
Assistant Examiner—Clifford C. Shaw
Attorney, Agent, or Firm—Karl F. Ross

[57] ABSTRACT

Apparatus for controlling an electric discharge machining process in which machining pulses are applied across a machining gap with a pulse duration and peak current preselected to attain a predetermined machining consequence or result. At least one monitoring pulse is interposed in the succession of machining pulses and is time-spaced from and totally independent of the machining pulses while being dimensioned to give rise to a current pulse in the machining gap. The current pulse is measured as to at least one characteristic and the gap condition is determined in response to this measurement.

2 Claims, 20 Drawing Figures

APPARATUS FOR DETECTING GAP CONDITIONS IN EDM PROCESSES WITH MONITORING PULSES

FIELD OF THE INVENTION

The present invention relates generally to electrical discharge machining, commonly called EDM, in which time-spaced discrete electrical discharges are effected across a machining gap formed between a tool electrode and a workpiece spacedly juxtaposed therewith to remove material from the workpiece. The invention is particularly concerned with a method of detecting gap conditions in the EDM process and an apparatus for carrying out the method.

BACKGROUND OF THE INVENTION

One of major problems in the art of EDM is detecting electrical or physical conditions in the machining gap. Thus, according to particular gap conditions existent or encountered in the EDM process, it is necessary, for example, to modify the application of discharge-producing electrical pulses to the machining gap, to control the rate of flushing the gap with the machining fluid and to regulate the conductivity of the machining medium. Further, once the machining gap suffers a contamination with machining chips, tar and other products which tends to bring about arcing, it is imperative that the gap-cleaning action be effectuated or intensified by means of vibration or retraction of the tool electrode relative to the workpiece. The follow-up feed or servo-displacement of the electrode must also be smoothly effected as machining proceeds and yet in response to change in the gap conditions.

There have in the past been proposed a number of gap-detecting methods, which may be classified into two groups. The first is to detect the gap voltage, current and/or other gap variable on an average basis and the second is to sense such variables on a per pulse basis. The averaging measurement is obviously less reliable because of its inability of instantaneous response and is therefore not adequate for prompt corrective action. On the other hand, the per pulse measurement may permit immediate countermeasures and can accordingly afford an enhanced machining efficiency. The problem is, however, that machining conditions themselves may affect parameters of individual machining pulses (i.e. peak current and on time, etc) which must be set at optimum values according to particular machining purposes (i.e., for obtaining a desired relationship of surface roughness, overcut, relative electrode wear, etc.). Hence the attempt to judge the machining conditions by sensing variables of machining pulses themselves leads most often to false results and a truly accurate determination of the gap conditions is not obtainable without adequately incorporating a change in parameters of machining pulses into sensing signals.

In a further attempt to detect gap conditions, there has also been introduced in the art pilot pulses or discharges which are used auxiliary to machining discharges. In the pilot-pulse methods which have been contemplated heretofore, a pilot signal is applied at a frontal or leading portion of each individual machining pulse to explore a pre-discharge gap condition for determining whether the gap would be in an adequate state so that the machining pulse may be triggered or for other control purposes. In these methods, the pilot "pilot pulse" is more or less integrated with the subsequent "machining" portion of each individual power pulse so that there may also be an adverse influence therefrom on each machining pulse with a set of prefixed parameters. Consequently the disadvantage mentioned earlier remain unresolved.

OBJECT OF THE INVENTION

It is therefore the object of the present invention to provide an EDM apparatus whereby gap conditions can be detected without interference with machining so that a judgement of machining conditions are obtainable with an increased accuracy and reliability with the result which is highly useful for controlling various machining parameters in the manner to achieve a desired machining consequence (i.e. relationship of surface roughness, overcut, relative electrode wear etc.) at an optimum efficiency.

SUMMARY OF THE INVENTION

In accordance with the present invention there is provided an apparatus for detecting EDM gap conditions in carrying out the steps of applying across a machining gap a succession of machining pulses having a pulse duration and peak current preselected to attain a desired machining consequence; interposing into said succession at least one monitoring pulse each time-spaced and independent from adjacent machining pulses, said monitoring pulse resulting in a gap current pulse having a pulse duration and peak current preselected independently from the machining pulses; measuring characteristics of the resulting monitoring gap current pulse thereby classifying it into one of at least two categories; and ascertaining the gap condition in response to the result of the preceding step, i.e. the classification.

In accordance with a specific aspect of the invention, the monitoring pulse has a pulse duration in the range between 5 and 20 microseconds and a pulse peak current in the range between 10 and 100 amperes. The pulse duration and peak current of the monitoring pulses, in combination, are, however, selected within said respective ranges preferably so as to be capable of achieving essentially a same machining performance as the machining pulse having different pulse duration and peak current. For example, since there is a relationship empirically established between surface roughness and pulse duration and peak current and expressed as $Ra = K\tau_{on}^{0.3} \cdot I_p^{0.4}$, if the machining pulses used have a pulse duration $\tau_{on}$ of 3 microseconds and a peak current $I_p$ of 10 amperes, then the pulse duration of monitoring pulses may be 10 microseconds with a peak current of 4 to 5 amperes. The monitoring pulses are applied, for example, at a frequency between 1 and 1000 Hz in conjunction with machining pulses applied at a frequency between 100 Hz and 500 kHz.

The measurement of a characteristic of the gap current signal resulting from the application of a monitoring pulse may be effected by measuring the voltage magnitude or another variable of the gap signal for comparison with a threshold value or a plurality of reference values predetermined for classification of gap discharges. The measurement may also be effected over each monitoring pulse or for a predetermined time period thereof excluding the instance of spark-over or gap breakdown which is transient in nature. It is also advisable to choose for the sensing time the end of each monitoring discharge by having the sensing system responsive to the cut-off signal of each monitoring pulse.

Gap discharges resulting from individual monitoring pulses may be classified into "good" and "bad" by ascertaining where the measured variable lies with reference to a threshold level. The "good" discharges may further be classified into "metallic phase" and "gas phase" discharges. The "gas phase" discharge has a discharge voltage of 15 to 25 volts and a high-frequency oscillating component of 5 to 20 volts and is produced purely by the discharge through a gas phase. The "metallic phase" discharge has a voltage of 10 to 15 volt and a high-frequency component of 2 to 5 volts and is produced at the end of discharge or upon clarification of an interelectrode gap short-circuiting by a machining chip. The characteristics of these types of discharges and a combination thereof will be more fully described hereinafter.

The determination of the gap conditions is effected advantageously by applying discharge-classifying signals through the respective channels to preset counters or a reversible counter to obtain collectively discriminated results so that development and tendency of machining conditions may be assured to provide control signals for one or more of controllable systems mentioned earlier.

In accordance with a further aspect of the invention, the classification of discharges resulting from monitoring pulses of a preselected pulse duration and peak current is effected advantageously by sensing the magnitude of high-frequency oscillatory current or voltage contained in the discharges mentioned already. As is well known in the art, if the discharge is of arcing or short-circuiting type, the high-frequency component is absent or not observable therein. It has thus only been recognized that a discharge is "normal" if such a component exists. The invention in this aspect is based upon the discovery that the high-frequency oscillatory discharge condition is affected by various machining factors including machining fluid and a combination or electrodes and is determinative of characteristics of resulting machining discharges (e.g., metallic-phase discharges and gas-phase discharges) and that a clear demarcation to this end is obtainable by the introduction of monitoring pulses of prefixed parameters independent of the machining pulses. The high-frequency component, which is apparently caused by electron avalanches of a duration of 0.03 to 1 microsecond has a frequency in the range between 1 and 30 MHz and a magnitude which, together with the discharge voltage magnitude, varies as a function of the molecular weight of the machining fluid used. The high-frequency oscillation tends to damp with time within each discharge and is distinctively observable for a period up to 15 microseconds and with a peak current not exceeding 100 amperes, in the range of each parameter given each individual monitoring pulse according to the invention. It is convenient to sense the high-frequency component in the gap upon, as referred to earlier, termination of a switching signal which applies each monitoring pulse since this avoids a transient period at the beginning of the discharge and because of a good timing expediency.

The high-frequency oscillatory voltage may be sensed also as the difference of its magnitude at the commencement of each monitoring discharge minus its magnitude at a given instant within the discharge divided by the time duration of this period.

BRIEF DESCRIPTION OF THE DRAWING

Certain embodiments of the invention will be described in the following with reference to the accompanying drawing in which:

FIGS. 1 A, B, C, D and E are schematic waveform diagrams showing various modes of monitoring pulse interposition into successions of machining pulses in accordance with the principles of the present invention;

FIGS. 11 A, B, and C are schematic waveform diagrams illustrating different forms of discharge;

SPECIFIC DESCRIPTION

Monitoring pulses with preselected pulse duration ($\tau_{on}$) and peak current ($I_p$) according to the invention may be interposed into machining pulses in any of various manners as illustrated in FIGS. 1 A-E with the ratio of monitoring pulses to machining pulses less than 1. Shown at A are monitoring pulses of a rectangular form and with a peak current lower than that of machining pulses as monitoring pulses of B. In the latter case, monitoring pulses have a pulse on-time or duration greater than machining pulses. In the example of C, monitoring pulses are shown periodically increasing its number from one, two to three. In D and E, monitoring pulses have a triangular and a halfwave rectified AC waveforms, respectively.

As noted earlier, machining pulses are preset with a pulse duration ($\tau_{on}$) and a peak current ($I_p$) which in combination are capable of attaining desired machining results, e.g., surface roughness (R) in $\mu$Rmax, overcut ($\delta_{out}$) in mm and relative electrode wear ($\gamma$) in volume %. In this connection the following relationships have empirically been established: $R = Kr \cdot \tau_{on}^{0.3} \cdot I_p^{0.4}$, $\delta_{out} = K\delta_0 \cdot \tau_{on}^{0.3} \cdot I_p^{0.3}$, $\gamma = K \cdot \tau_{on}^{-0.1} \cdot I_p^{-0.2}$ ("wear" mode) and $\gamma' = Kr' \cdot \tau_{on}^{-1.8} \cdot I_p$ ("no wear" mode). Monitoring pulses on the other hand are preset with a pulse duration in the range between 5 and 20 microseconds and a pulse peak current in the range between 10 and 200 amperes for consideration of ease of discrimination between distinct characteristic discharges as will be described in more detail hereinafter. While monitoring pulses are thus preset independently from presetting of machining pulses, it is yet possible in consideration of the aforementioned relationships to have a monitoring pulse achieve substantially same machining performance as a machining pulse. For example, with machining pulses of a preset duration of 3 microseconds and peak current of 10 amperes, monitoring pulses may be set with 10 microseconds and 4 to 5 amperes so that a substantially same surface roughness may result from both pulses. The number of monitoring pulses in typical EDM operations may be in the range between 1 and 10 per second.

Figure 1A:
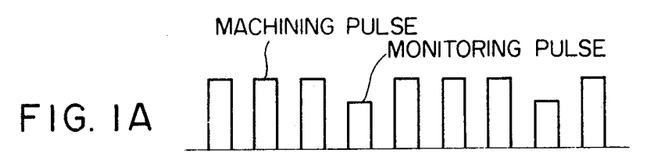
Figure 1B:
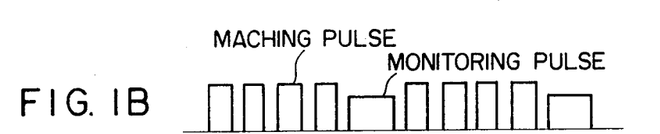
Figure 1C:
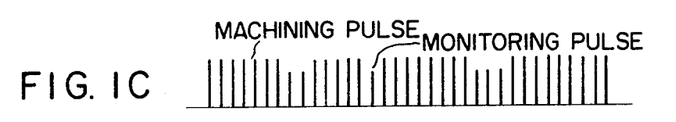
Figure 1D:
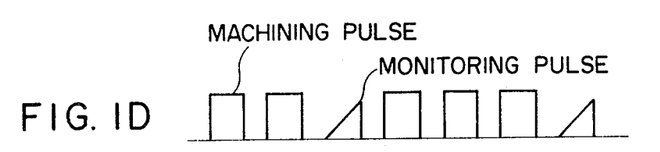
Figure 1E:
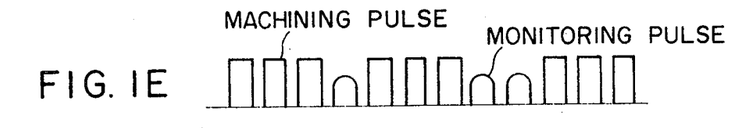
Figure 2:
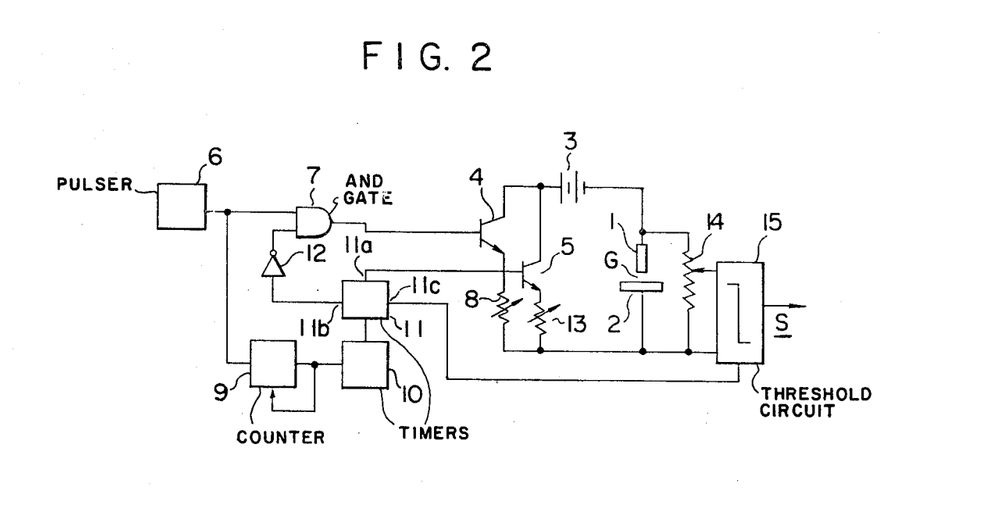
FIG. 2 is a circuit diagram illustrating a gap-condition detector system for embodying the present invention.

In FIG. 2 there is shown a system for applying, in accordance with the present invention, both machining pulses and monitoring pulses to an EDM gap G formed between a tool electrode 1 and a workpiece 2 to provide at its output a sensed information signal S resulting from the gap monitoring. The machining gap G is typically filled and flushed with a dielectric liquid which forms a machining medium and also serves to carry away machining products from the region of the gap G.

The system of FIG. 2 includes a DC source 3 forming a common power supply for machining and monitoring pulses and connected in series with the machining gap G via parallel-connected branches respectively including a pair of switching elements 4 and 5 shown as transistors. The switch 4 is controlled by a pulser 6 via an AND gate 7 and thereby turned on and off to alternately connect and disconnect the DC source 3 to the electrode 1 and the workpiece 2 at a frequency determined by the pulser 6. As a consequence, a succession of machining pulses are produced across the machining gap G with a pulse duration ($\tau_{on}$) established by setting at the pulser 6. The switch 4 has an adjustable resistor 8 connected in series therewith for establishing the peak current ($I_p$) of the machining pulses.

Figure 3:
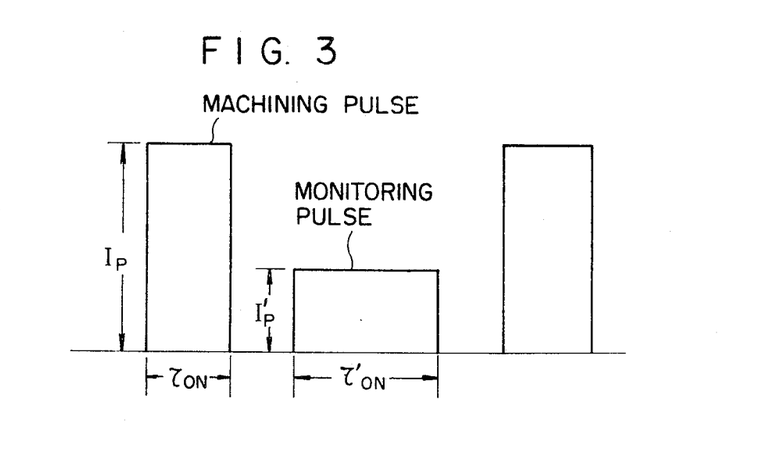
FIG. 3 is a schematic waveform diagram illustrating machining pulses and a monitoring pulse produced in the system of FIG. 2.

The pulser 6 has an additional output fed to a counter 9 which is adapted to count a preset number of output pulses from the pulser 6 for resetting thereupon while issuing a timing signal. The timing signal is applied to a first timer 10 which may be constituted by a monostable multivibrator that provides a pulse of a predetermined first duration and is adapted to trigger, upon termination of said duration, a second timer 11 which may again be a monostable multivibrator that provides a pulse of a predetermined second duration. This latter pulse having a pulse duration ($\tau_{on}'$) is applied from the first output 11a of the timer 11 to turn it on thereby connecting the DC source 3 to the electrode 1 and the workpiece 2. The same pulse or a modified signal therefrom is fed at the second terminal 11b of the timer 11 to one input terminal of the AND gate 7 via an inverter 12 to disable the AND gate 7 which is normally enabled. Consequently, the machining pulse signal are inhibited from passage to the switch 4 and a monitoring pulse is produced across the machining gap G through the switch 5. The latter has an adjustable resistor 13 connected in series therewith for establishing the peak current ($I'_p$) of the monitoring pulse. The pulse duration of the monitoring pulse ($\tau_{on}'$) is, of course, determined and set at the timer 11. When the monitoring pulse is terminated, the AND gate is again enabled and a preselected number (set at the counter 9) of machining pulses recommence. This mode of the last machining pulse in a train and the first machining pulse in the subsequent train interposed by a monitoring pulse is apparent from FIG. 3.

The timers 10 and 11 may also be adapted to provide an inhibiting signal for disabling a number of machining pulses to be passed through the gate 7 and to provide several monitoring signal pulses to be applied to the switch 5 for effecting the several monitoring pulses during the time period in which the machining pulses are inhibited. Further, depending on the size of the pulse off-time of machining pulses relative to their on-time, of course, one or more monitoring pulses may be produced during the normal pulse off-time of machining pulses with a proper setting of timers 10 and 11.

A sensing resistor or potentiometer 14 connected across the machining gap G between the electrode 1 and the workpiece 2 feeds into threshold circuit 15 having another input fed by a third output terminal 11c of the timer 11 so that the gap voltage during the application of each monitoring pulse detected at the sensing resistor 14 is discriminated with reference to one or more threshold levels set in the circuit 15 to determine the type of discharge resulting from the application of each monitoring pulse.

Figure 4:
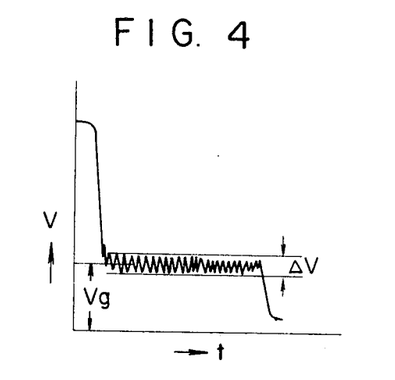
FIG. 4 is a schematic waveform diagram illustrating a voltage waveform of a discharge containing a high-frequency oscillatory component.

For the purpose of classification of discharges, while the gap voltage may satisfactorily be used, a more accurate determination is obtained by measuring high-frequency oscillatory components contained in the discharge voltage and current. In FIG. 4 there is shown the waveform of "normal" discharge voltage resulting from the application of a monitoring pulse with a preselected pulse duration and peak current adequate for monitoring. The high-frequency oscillatory component $\Delta V$ of a frequency or frequencies in a range between 1 and 30 MHz is contained in the discharge and superimposed on its DC component Vg. Once the machining gap is short-circuited or arcing develops, this oscillatory condition disappears or becomes substantially unobservable. Thus, measuring the presence or absence of this component provides adequate information for gap monitoring.

Figure 5:
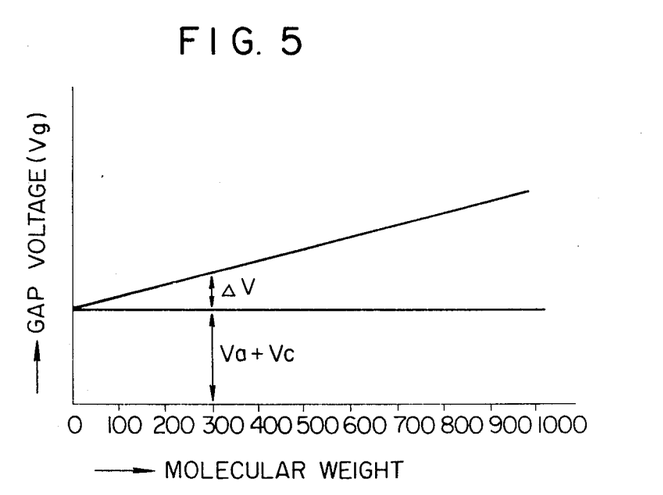
FIG. 5 is a graphical representation showing the magnitudes of discharge voltage and high-frequency component thereof which vary as a function of the molecular weight of machining fluid.

It has now been discovered further that the magnitude of the high-frequency oscillatory component has also a dependency on the kind of machining medium. Thus, for example, with pure water (having molecular weight of 18) utilized as machining fluid, the magnitude $\Delta V$ is extremely small. The high-frequency magnitude $\Delta V$ is increased with kerosine (having molecular weight of 200 to 300) and further with spindle oil (having molecular weight of about 700). FIG. 5 is a graph representing experimental results in which the gap voltage Vg is plotted along the ordinate and the molecular weight of machining fluid is plotted along the abscissa. The graph shows that the gap voltage Vg which is the sum of anodic potential drop Va, cathodic potential drop Vc and high-frequency voltage component $\Delta V$ increases as the latter increases with Va+Vb being constant, with the increase in the molecular weight of machining medium. It has been observed that $\Delta V$ amounts to approximately 10 volts with spindle oil which are high in molecular weight. An assumption for the phenomenon is that electrons emitted from the cathode is more readily absorbed into molecules of higher molecular weight medium, causing an enhanced pulsation of discharge. With a medium of lower molecular weight, electrons will less meet barriers so that a more continuous discharge with an increased number of free electrons may result. However, when a medium which is high in molecular weight is degraded into lower molecular weight fragments by cracking during machining discharges, there will develop an arc or arc-like discharge with less high-frequency oscillation. Accordingly, the classification of discharges with an increased accuracy is obtainable by judging the sensed high-frequency component signal with reference to a particular level corresponding to the particular molecular weight of machining fluid employed. It should also be noted that the frequency of a high-frequency component is essentially proportional to its magnitude and may be used instead of the latter for sensing.

It has already been mentioned that the pulse duration and peak current of a monitoring pulse must be selected such as to allow an optimum monitoring. When the peak current employed is excessively high, thermal electrons will increase excessively tending to cause larger molecules to be decomposed into excessively smaller molecules so that the high-frequency component may disappear. The high-frequency oscillation also diminishes with the lapse of discharge time as higher molecules decompose. Hence it is necessary that the monitoring pulse be shaped properly both in width and magnitude, independently of machining pulses which must be shaped for consideration of machining consequences.

Figure 6:
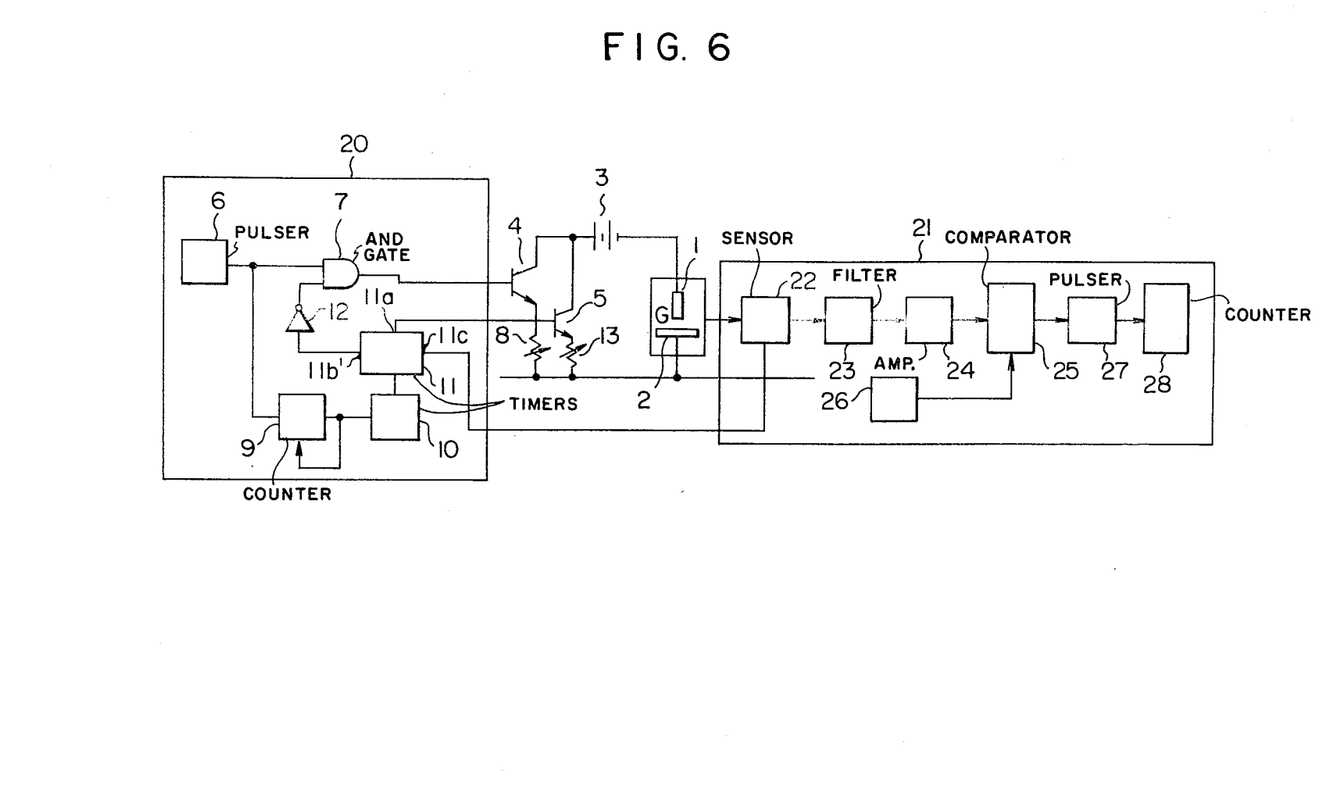
FIG. 6 is a circuit diagram illustrating a gap-condition detector system with a machining pulse and monitoring power supply arrangement of FIG. 2 and including a sensing unit responsive to the high-frequency oscillatory discharge component.

In FIG. 6 there is shown a device including a machining pulse and monitoring pulse supply system 20 which is here essentially equivalent to that shown in FIG. 2 and a gap-condition detector system 21 responsive to the high-frequency component in monitoring discharge pulses. In this system, the discharge voltage resulting from a monitoring pulse applied across the machining gap G is sensed by a sensing network 22 which has a second input terminal energized by the monitoring pulser 11 and is hence responsive to the gap G selectively during each monitoring pulse or a predetermined time period within or immediately subsequent to each monitoring pulse. The sensed signal at the network 22 is fed to a filter circuit 23 which extracts from the input signal a high-frequency component ($\Delta V$ in FIG. 4) selectively that is fed to an amplifier 24 which converts it into an amplified DC output. The next stage comprises a comparator 25 having a threshold value set therein for comparison of the incoming DC signal representative of the magnitude $\Delta V$ of the high-frequency component. The threshold value is variably set by a preset network (reference-signal source) 26 in accordance with the molecular weight of machining fluid utilized. It will be apparent that with water as machining fluid having a low molecular weight the threshold is set to be sensitive to a minimum value and an increased level is used as the threshold for machining liquid of a higher molecular weight as can be seen from FIG. 5. Should the incoming "high-frequency" signal be found to exceed the threshold level indicating that the sensed discharge is a "good" discharge, a "1" signal may be produced by a pulser 27 provided at the output of the comparator 25 and may be forwarded to a counter unit 28. The latter may be a preset counter adapted to count a present number of incoming pulses to provide an output pulse upon counting indicating that machining continues under a satisfactory condition. Alternatively, the pulser 27 may issue a "1" signal in response to the comparator 25 determining the "high-frequency" signal to be less than the threshold and the preset counter 28 may, upon counting a preset number of incoming "bad discharge" signal pulses, issue a signal indicating that machining is shifting into an unsatisfactory condition. It is also possible to have the counter 28 constituted by an up/down counter having a pair of input terminals for counting pulses from separate respective pulsers 27 (and 27') coupled to the comparator 25 so that the counting level of the up/down counter indicates the degree of performance or satisfactoriness of machining in the gap. The output signal from the counter 28 may be utilized for the control of any one or a combination of machining parameters, i.e. signals for electrode servomechanism, gap cleaning, modification of machining pulses etc.

Figure 7:
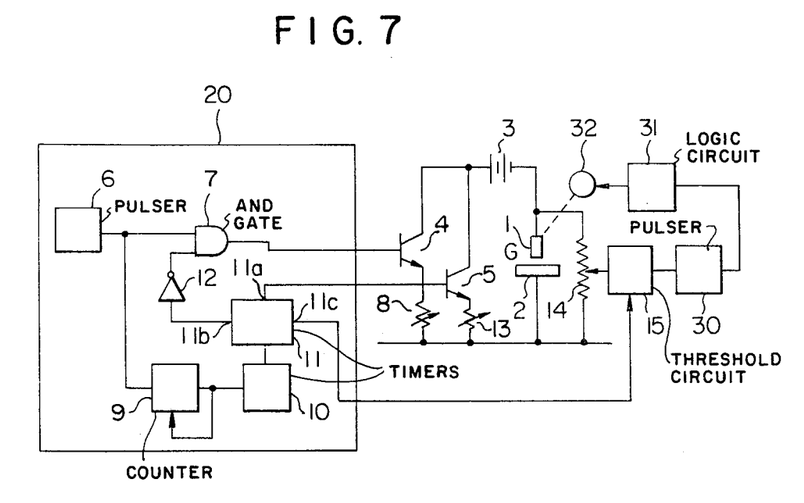
FIG. 7 is a circuit diagram illustrating a servo-control assembly incorporating a gap-condition detector system according to the invention.

In FIG. 7 there is shown a servo-control system for controlling the relative displacement between a tool electrode 1 and a workpiece 2 to maintain the size of the machining gap G therebetween substantially constant as machining proceeds. This system again includes a machining power pulse and monitoring pulse supply unit 20 mentioned previously. Also in this arrangement as well, a sensing resistor 14 is connected across the machining gap G to detect discharge voltage or current and, in conjunction with a threshold network 15, to provide signals characterizing monitoring pulse discharges effected. Thus, the threshold network 15 may be responsive directly to discharge voltage or current with reference to a threshold level as in the embodiment of FIG. 2 or to the high-frequency component thereof with reference to a threshold level as in the embodiment of FIG. 6. Here again, the threshold network 15 may actuate a pulser 30 to provide either one or both of digital signals, which may be treated in a logic circuit 31. The logic circuit provides an "advance" or "retraction" signal to a drive motor 32 for the electrode 1 or the workpiece 2 in accordance with its collective processing results of discharge-characterizing signals received from the pulser 30. Obviously, the logic circuit 31 may be constituted by a plurality of preset counters and/or an up/down counter having suitable outputs.

Figure 8:
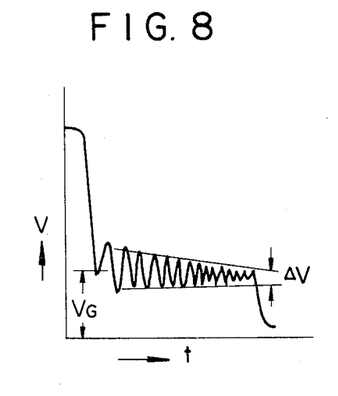
FIG. 8 is a waveform diagram similar to that of FIG. 4 and with an emphasis on the damping of the high-frequency component.
Figure 9:
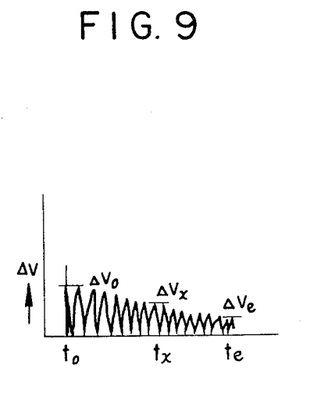
FIG. 9 is a diagrammatic illustration of the high-frequency component alone extracted from discharge voltage waveform.

FIG. 8 shows a waveform diagram similar to that of FIG. 4 mentioned previously. The high-frequency component shown there superimposed on the DC component of discharge voltage and divided from the latter is shown in FIG. 9. It is shown that the high-frequency oscillation diminishes with the lapse of time within a discharge and it has already been pointed out that measurement of this component is meaningful only when its dependency on the kind and change of machining fluid is taken into consideration. Such dependency may, however, be substantially compensated for if measurement is made of change in $\Delta V$ with time.

Thus, as shown in FIG. 9, the magnitudes of the high-frequency oscillation at an instant to immediately following the commencement of discharge and at an instant tx in the midth of the discharge may be measured as $\Delta Vo$ and $\Delta Vx$, respectively and a calculation made on the value $\Delta Vo - \Delta Vx/tx - to$. If detection of the magnitude at the end of discharge is possible, $\Delta Vo - \Delta Ve/te - to$ or $\Delta Vx - \Delta Ve/te - tx$ may be used for "excellent", "good", "fine" or like classifications.

Figure 10:
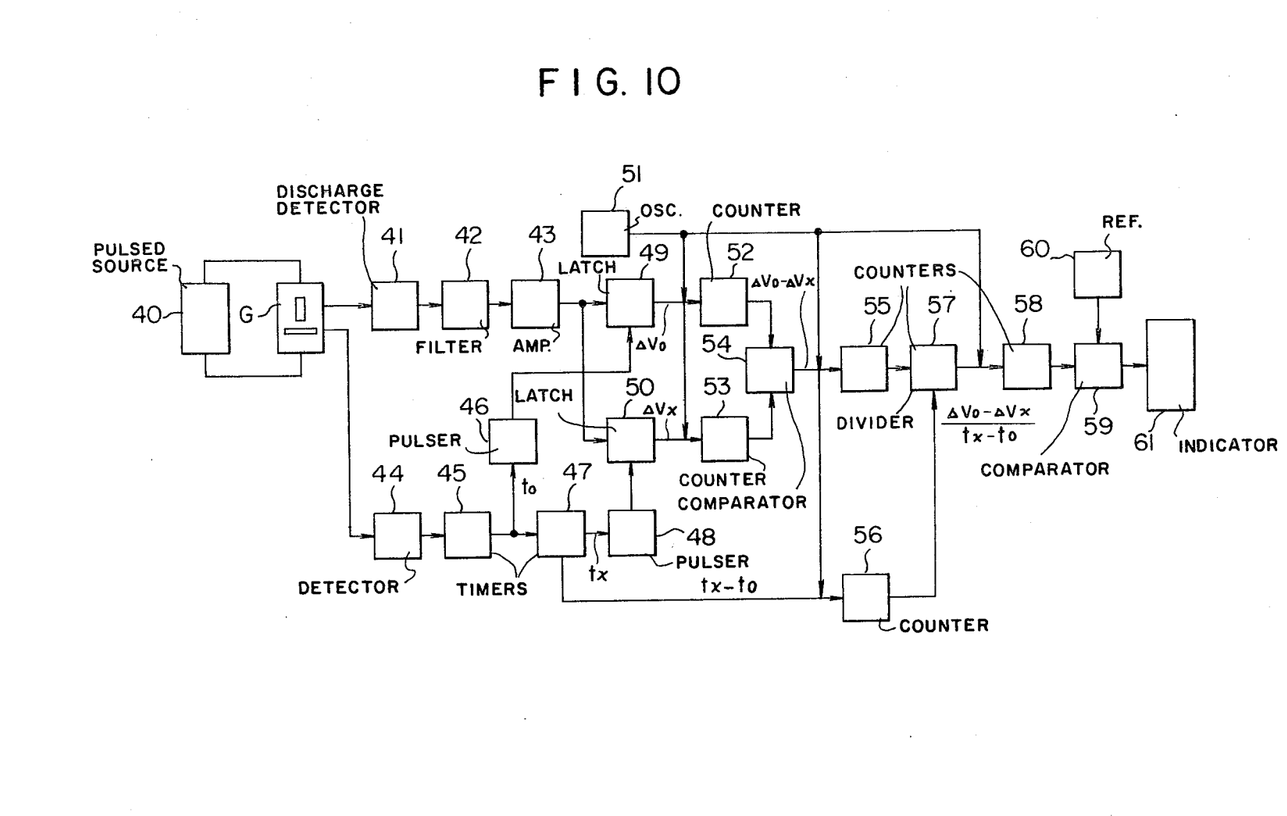
FIG. 10 is a circuit diagram of a further gap-condition detector system responsive to the high-frequency component.

A circuit assembly shown in FIG. 10 is designed to achieve this end, comprising a monitoring pulse supply 40 (as has been described) connected across a machining gap G between a tool electrode and a workpiece. In the FIGURE, a machining pulse supply is omitted. The circuit assembly includes a monitoring discharge detector 41, a filter 42 and an amplifier 43 as described in connection with FIG. 6, the amplifier 43 providing an amplified DC signal representative of the magnitude (time-varying) of the high-frequency oscillatory component of the discharge $\Delta V$ as has been described. On the other hand, the commencement of each monitoring discharge is detected by a detector 44 coupled to the machining gap G to trigger a timer 45 into activation, this timer upon deactivation at the instant to actuating a pulser 46. The pulser thus provides a narrow checking pulse at the instant to. The timer 45 also operates a second timer 47 which upon deactivation at the instant tx activates a second pulser 48 which provides a narrow checking pulse at this instant.

A latch circuit 49 is responsive both to the output of the amplifier 43 and the checking pulser 47 for memorizing the high-frequency signal $\Delta V_o$ from the amplifier 43 at the instant to. A second latch circuit 50 is responsive to the output of the amplifier 43 and to the checking pulser 48 for memorizing the high-frequency output $\Delta V_x$ of the amplifier 43 at the instant tx. A clock oscillator 51 is provided to substitute for and count latched signals. Thus, a counter 52 is provided to count the latched signal $\Delta V_o$ and a counter 53 counts the latched signal $\Delta V_x$. A comparator 54 compares the outputs of counters 52 and 53 to provide at its output a difference $\Delta V_o - \Delta V_x$. The difference signal is substituted by clock pulses which are counted by a counter 55. A further counter 56 substitutes the operating time $tx - to$ of the timer 47 with clock pulses. The outputs of counters 55 and 56 are compared by a divider 57 which provides an output signal $\Delta V_o - \Delta V_x / tx - to$, a change of the high-frequency component with time. This signal is in turn substituted by clock pulses which are counted by a counter 58 which feeds into a comparator 59 having one or a plurality of threshold levels set therein by a preset network 60 and with which the output of the counter 58 is compared. The threshold levels are variably set in consideration of the kind or molecular weight of machining fluid used, parameters of machining pulses, i.e. pulse duration, pulse interval and peak current, the electrode polarity, materials of the electrode and the workpiece and other machining parameters.

The signal $\Delta V_o - \Delta V_x / tx - to$ may typically be represented in volt per microsecond. A gap condition tested by a monitoring pulse which results in this form of signal being 0.06 to 0.02 may be regarded as "excellent" or "good" and a gap condition with the signal being 0.1 to 0.07 may be defined as "fine" or "not good". The corresponding signals are applied to an indicator network 61 which may function to collectively discriminate the input signals to provide control signals for the machining power supply, the electrode feed and retraction control system, the machining fluid supply unit etc.

Of course, with a monitoring pulse having a consequence of arcing or short-circuiting, the absence of the high-frequency component gives an indication of such unacceptable gap characteristics. In accordance with the detection method just described, however, more subtle and expanded discrimination is obtainable, i.e. characterization of two substantially distinct discharges both involving the presence of the high-frequency component. For example, there may be a discharge in which the high-frequency component is existent at the instant to but it rapidly diminishes so that it disappears in the midst of the discharge, i.e. at the instant tx. Such pulse may itself not essentially be detrimental but represents an undesirable gap condition which invokes a succession of machining pulses with little stock removal or which leads to arcing.

Still important characterization of gap discharges in accordance with the invention lies in gas-phase discharges, metallic-phase discharges and a combination thereof which has hitherto been commonly regarded as "normal". As experimentation demonstrates, however, a metallic discharge is less efficient in stock removal 30% than a gas-phase discharge. As experimentation indicates, a gas-phase discharge occurs with a gap voltage (discharge-sustaining) in the range of 15 to 25 volts and a high-frequency component in the range of 5 to 20 volts. A metallic-phase discharge occurs with a gap discharge of 10 to 15 volts and a high-frequency component of 2 to 5 volts. The metallic discharge appears to take place near the end of a discharge pulse or upon clarification a short-circuiting condition caused by machining chips. An arc discharge is seen to bring about under the condition in which a discharge point struck by a metallic-phase discharge is excessively heated and has a gap voltage of 6 to 10 volts and a high-frequency component less than 1 volts. Thus, including an open-gap pulse, gap discharges may be classified into about five categories.

Figures 11A, 11B:
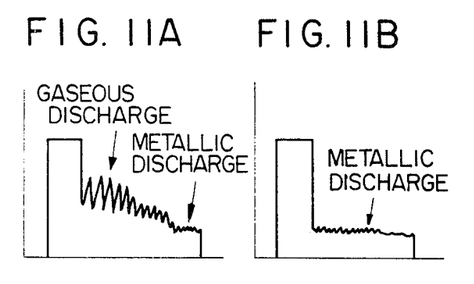
Figure 11C:
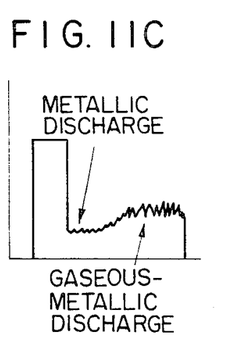
Figure 12:
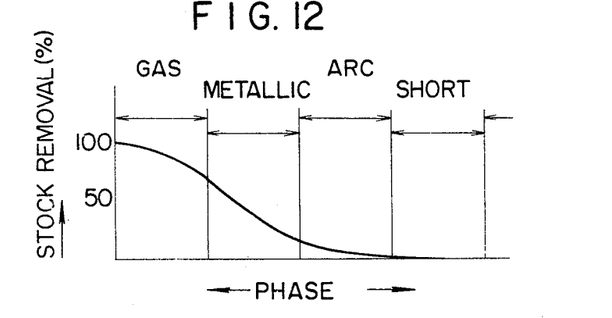
FIG. 12 is a graphical representation of stock removal versus difference in phase of discharge.
Figure 13:
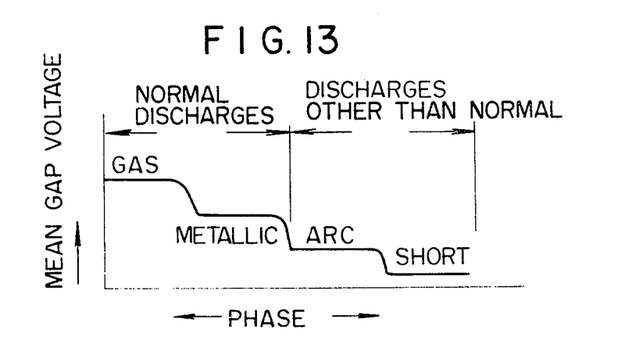
FIG. 13 is a graphical representation of mean gap voltage versus difference in phase of discharge.

In FIGS. 11A-11C there are shown different modes of characteristic discharges which may occur with a single applied pulse. With a pulse shown at A, there develops a gas-phase discharge in the incipient stage of the pulse and, as gaseous vapors are mixed with metallic vapors and the latter's concentration increases in the discharge column, it tends to shift into a metallic-phase discharge. Typically, such a discharge pulse is optimum in machining performance. As shown at B, if a discharge pulse has a high content of metallic vapors from its incipient stage, this is a typical metallic-phase discharge. It is also possible, as shown at C, that a metallic discharge shifts into a mixed gas and metallic discharge with the gaseous vapor concentration augmented. Machining pulses having characters shown at B and C are low in stock removal performance. From FIG. 12, it is seen that the stock removal by a metallic discharge is 50 to 70% of that by a gas discharge and an arc discharge permits removal only several percent of the removal by the gas discharge. Naturally, normal discharges may be referred to include gas-phase discharges to metallic-phase discharges while abnormal discharges from arc discharges to short-circuiting.

Figure 14:
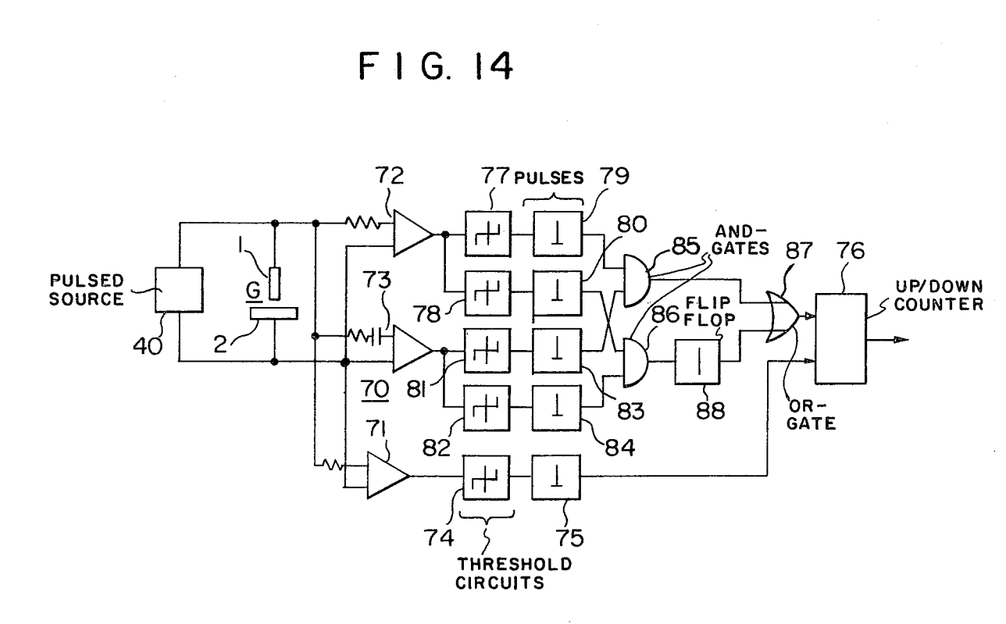
FIG. 14 is a circuit diagram for discriminating between different forms of discharge according to the invention.

In FIG. 14 there is shown a further circuit arrangement for detecting monitoring pulses to discriminate between distinct discharges. As in the previous embodiments, a monitoring pulse supply 40 provides across the machining gap G a monitoring pulse interposed into a succession of machining pulses supplied from a machining power source (not shown) and the resulting gap voltage or current is sensed by a detector 70. Here, the detector 70 comprises three sensing networks 71, 72 and 73 connected in parallel with one another across the machining gap G.

The sensing network 71 feeds a sensed DC signal into a threshold circuit 74 which determines from the sensed discharge signal if the discharge is normal or abnormal with reference to a threshold value set therein and provides one or both of the corresponding signals which may be pulsed by a pulser or pulsers 75 whose output is applied to an up/down counter 76. The detector 72 senses a DC component of the discharge whereas the detector 73 senses an AC (high-frequency) component of the discharge and transforms it into a DC signal.

The senser 72 has a pair of threshold circuits 77 and 78 at its output. The threshold circuit 77 determines from the incoming signal if the discharge is of gas-phase with reference to a threshold level set therein corresponding to the gas-phase gap voltage and, if determined so, provides an output signal which operates a pulser 79 for issuing a pulse. The output pulse of the pulser 79 is thus indicative of "gas-discharge" signal. The threshold circuit 78 determines from the incoming signal if the discharge is of metallic-phase with reference to a threshold level set therein corresponding to the metallic-phase gap voltage and, if determined so, provides an output signal which operates a pulser 80 for issuing a pulse. The output pulse of the pulser 80 is thus indicative of "metallic-discharge" signal.

The sensor 73 likewise has a pair of threshold circuits 81 and 82 at its output. The threshold circuit 81 determines from the incoming high-frequency signal if the discharge is of gas phase with reference to a threshold level set therein corresponding to the gas-phase high-frequency voltage component and, if determined so, provides an output signal which operates a pulser 83 for issuing a pulse. The output pulse from the pulser 83 is thus indicative of "gas-phase" signal. The threshold circuit 82 determines from the incoming high-frequency signal if the discharge is of metallic phase with reference to a threshold level set therein corresponding to the metallic-phase high-frequency voltage component and, if determined so, provides an output signal which operates a pulser 84 for issuing a pulse. The output pulse from the pulser 84 is thus indicative of "metallic-discharge" signal.

An AND gate 85 is provided responsive both to the outputs of pulsers 79 and 85 to provide an output signal whin the "gas-discharge" signal is received from the both counters. Likewise a second AND gate 86 is provided responsive both to the outputs of pulsers 80 and 85 to provide an output signal when the "metallic-discharge" signal is received from the both pulsers. The output of the first AND gate 85 has the first input terminal of an OR gate 87 whose second input terminal is connected to the output of the second AND gate 86 via a flip-flop circuit 88 and whose output terminal is fed to the up/down counter 76.

The flip-flop 88 here serves as a divider for the "metallic-discharge" signal from the AND gate 86. The output of the OR gate thus provides, for registration at the up/down counter 76, a signal corresponding to the number of gas-phase discharges plus one half the number of metallic-phase discharge. This takes into account the fact that, as described hereinbefore, a metallic discharge is one half or so less efficient in stock removal performance, than a gas-phase discharge. This signal may be used to level up the counter 76 one step every time it issues while the "abnormal discharge" signal received from the pulser 75 may be used to level down the up/down counter 76. The output of the up/down counter 76 is provided with an indicator and/or a signal processing unit for controlling one or a plurality of machining parameters as described hereinbefore.

We claim:

1. An apparatus for detecting gap conditions in EDM processes, which comprises:
   (a) means for applying across a machining gap a succession of machining pulses, comprising a first electronic switch connected in series with a DC source and said gap and a pulser for intermittently energizing said first switch;
   (b) means for presetting a pulse duration and peak current of said machining pulses, including first variable resistor means connected in series with said first switch, said DC source and said gap;
   (c) means for interposing at least one monitoring pulse into said succession of machining pulses, including a second electronic switch connected in parallel with said first electronic switch in series with said DC source and said gap and energizable by said pulser;
   (d) means for presetting a pulse duration and peak current of said monitoring pulses, including second variable resistor means connected in series with said second switch, said DC source and said gap;
   (e) means for measuring a characteristic of a gap current pulse resulting from said monitoring pulse to classify it into one of at least two categories;
   (f) means responsive to the last-mentioned means for indicating the gap condition;
   (g) an AND gate having a first input terminal connected to the output of said pulser and an output connected for energizing said first electronic switch;
   (h) a counter for counting a preset number of output pulses from said pulser for resetting thereupon while providing a first timing signal;
   (i) a first timer adapted to actuate in response to first timing signal to provide a first signal pulse of a predetermined duration;
   (j) a second timer triggerable upon termination of said first duration to provide a second signal pulse of a predetermined second duration, said second timer being connected for energization of said second electronic switch thereby to produce said monitoring pulse; and
   (k) gate means connected between said second timer and the second input terminal of said AND gate for disabling the latter in the presence of said second signal pulse.

2. The apparatus defined in claim 1 wherein said means (e) comprises a threshold circuit connected with said machining gap and operable in response to said second signal pulse for measuring the gap current.

* * * * *